United States Patent
Fukami et al.

(10) Patent No.: US 11,451,026 B2
(45) Date of Patent: Sep. 20, 2022

(54) SHAPE MAINTAINING TOOL

(71) Applicants: AutoNetworks Technologies, Ltd., Mie (JP); Sumitomo Wiring Systems, Ltd., Mie (JP); Sumitomo Electric Industries, Ltd., Osaka (JP)

(72) Inventors: Yuuya Fukami, Mie (JP); Shinya Itou, Mie (JP)

(73) Assignees: AutoNetworks Technologies, Ltd., Yokkaichi (JP); Sumitomo Wiring Systems, Ltd., Yokkaichi (JP); Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 16/493,936

(22) PCT Filed: Mar. 14, 2018

(86) PCT No.: PCT/JP2018/009846
§ 371 (c)(1),
(2) Date: May 18, 2021

(87) PCT Pub. No.: WO2018/168890
PCT Pub. Date: Sep. 20, 2018

(65) Prior Publication Data
US 2021/0273431 A1 Sep. 2, 2021

(30) Foreign Application Priority Data
Mar. 16, 2017 (JP) .............................. JP2017-051389

(51) Int. Cl.
*H02G 3/04* (2006.01)
*B60R 16/02* (2006.01)
(Continued)

(52) U.S. Cl.
CPC ....... *H02G 3/0456* (2013.01); *B60R 16/0215* (2013.01); *H02G 3/0406* (2013.01);
(Continued)

(58) Field of Classification Search
CPC ...... H02G 3/0456; H02G 3/0406; H02G 3/32; B60R 16/0215; B60R 16/033; H01B 7/0807
See application file for complete search history.

(56) References Cited

U.S. PATENT DOCUMENTS 4,356,599 A * 11/1982 Larson ..................... F16L 3/12
24/16 PB
4,635,886 A * 1/1987 Santucci .................. F16L 3/12
24/543
(Continued)

FOREIGN PATENT DOCUMENTS

JP S61-174819 A 8/1986
JP H9-191528 A 7/1997
(Continued)

OTHER PUBLICATIONS

International Search Report, Application No. PCT/JP2018/009846, dated Apr. 17, 2018. ISA/Japan Patent Office.

*Primary Examiner* — Anita M King
(74) *Attorney, Agent, or Firm* — Honigman LLP

(57) ABSTRACT

Provided is a shape maintaining tool for maintaining the shape of the plate-shaped metal wire when the metal wire is routed. The shape maintaining tool includes a first member that has a first holding portion for holding the metal wire and also has a first coupling portion that is to be fixed to the first holding portion. A second member has a second holding portion for holding the metal wire and a second coupling portion that is to be fixed to the second holding portion. The first coupling portion and the second coupling portion are rotatably coupled so as to rotate at least the width direction (Continued)

of the metal wire that is held by both the first holding portion and the second holding portion.

10 Claims, 8 Drawing Sheets

(51) Int. Cl.
*H02G 3/32* (2006.01)
*B60R 16/033* (2006.01)
*H01B 7/08* (2006.01)

(52) U.S. Cl.
CPC .............. *H02G 3/32* (2013.01); *B60R 16/033* (2013.01); *H01B 7/0807* (2013.01)

(56) References Cited

U.S. PATENT DOCUMENTS

| | | | | |
|---|---|---|---|---|
| 5,112,013 A * | 5/1992 | Tolbert | ................... | F16L 3/137 248/74.3 |
| 6,109,569 A * | 8/2000 | Sakaida | ................. | F16L 3/222 248/316.7 |
| 7,185,399 B2 * | 3/2007 | Logan | ................... | F16L 3/233 24/16 PB |
| 7,185,770 B1 * | 3/2007 | Roten | ................... | A47B 81/00 211/70.6 |
| 7,507,906 B2 * | 3/2009 | Suzuki | ................... | H02G 3/32 174/68.1 |
| 8,099,837 B2 * | 1/2012 | Santin | ................. | B60N 2/5825 24/297 |
| 2003/0215601 A1 * | 11/2003 | Pedde | ................ | B29C 44/1271 428/102 |
| 2017/0355327 A1 | 12/2017 | Hida et al. | | |

FOREIGN PATENT DOCUMENTS

| | | |
|---|---|---|
| JP | 2007-112187 A | 5/2007 |
| JP | 2010-283945 A | 12/2010 |
| JP | 2011-24356 A | 2/2011 |
| JP | 2013-099179 A | 5/2013 |
| JP | 2013-198206 A | 9/2013 |

* cited by examiner

SHAPE MAINTAINING TOOL

CROSS-REFERENCE TO RELATED APPLICATIONS

This application is the U.S. national stage of PCT/JP2018/009846 filed on Mar. 14, 2018, which claims priority of Japanese Patent Application No. JP 2017-051389 filed on Mar. 16, 2017, the contents of which are incorporated herein.

TECHNICAL FIELD

This disclosure relates to a shape maintaining tool for maintaining the shape of a plate-shaped metal wire when the metal wire is routed.

BACKGROUND

JP 2016-120901A discloses an automobile power supply device that supplies electrical power to units of a vehicle with use of a plate-shaped metal wire that is routed from a battery, which is arranged in an engine room of the vehicle body, to the vehicle interior.

Also, J P 2013-198206A discloses technology for maintaining a wire harness in a specified shape.

When a plate-shaped metal wire is routed, the metal wire is bent at predetermined position with the width direction serving as the bending axis, and it is desirable to maintain the bent shape in front of and behind the predetermined position in view of fixing the metal wire to the vehicle body in the vicinity of the predetermined position.

However, neither JP 2016-120901A nor 2 disclose technology for maintaining the bent shape of the plate-shaped metal wire as described above.

In view of this, an object of the present disclosure is to provide a shape maintaining tool that can easily maintain the bent shape of a plate-shaped metal wire that is bent at a predetermined position with at least the width direction serving as the bending axis when the metal wire is routed.

SUMMARY

In order to solve the foregoing problem, a shape maintaining tool maintains a shape of a plate-shaped metal wire when the metal wire is routed. The shape maintaining tool includes: a first member having a first holding portion for holding the metal wire, and having a first coupling portion that is to be fixed to the first holding portion; and a second member having a second holding portion for holding the metal wire, and having a second coupling portion that is to be fixed to the second holding portion, wherein the first coupling portion and the second coupling portion are coupled so as to be capable of rotating about at least a width direction of the metal wire that is held by both the first holding portion and the second holding portion.

Advantageous Effects of Disclosure

By adjusting the coupling angle of the first coupling portion and the second coupling portion, the metal wire held by the first holding portion and the second holding portion can be easily maintained in a shape of being bent at a predetermined position with at least the width direction serving as the bending axis.

DETAILED DESCRIPTION OF PREFERRED EMBODIMENTS

First Embodiment

Overall Configuration

Figure 1:
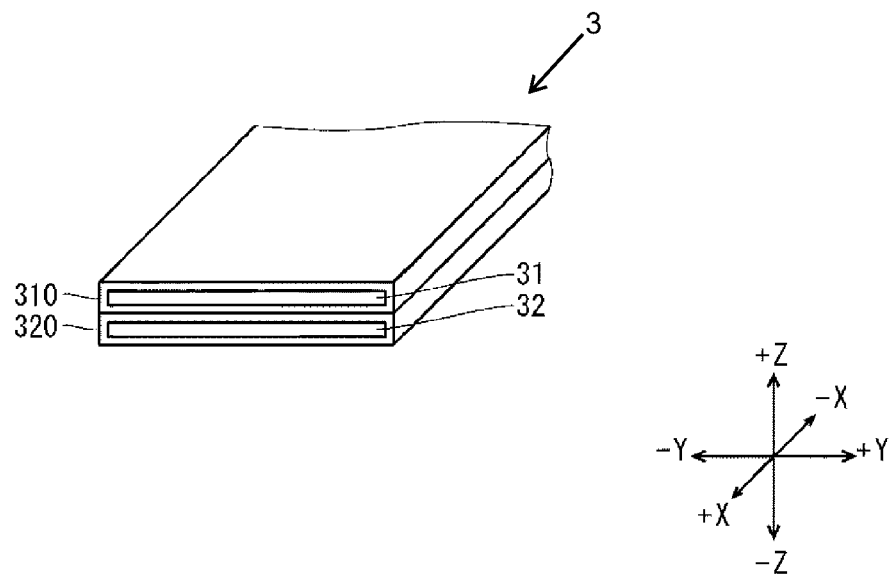
FIG. 1 is a perspective view showing an overview of an example of the configuration of a metal wire.

FIG. 1 is a perspective view schematically showing an example of the configuration of a metal wire 3. In FIG. 1 and the subsequent figures, XYZ orthogonal coordinate axes have been provided as necessary in order to clarify the relationships between directions.

The metal wire 3 includes conductor plates 31 and 32 and insulating sheaths 310 and 320 that are provided surrounding the conductor plates 31 and 32 respectively. The metal wire 3 is for installation in a vehicle as will be described later.

The conductor plate 31 has an elongated shape extending in a lengthwise direction (corresponding to a ±X direction in FIG. 1), and has a flattened shape in a cross-section perpendicular to the lengthwise direction (corresponding to a YZ cross-section in FIG. 1, which will also be called the module cross-section hereinafter). The module cross-section of the conductor plate 31 may have a rectangular shape, for example. The dimension of the conductor plate 31 in a thickness direction (this direction corresponding to a ±Z direction in FIG. 1, and this dimension simply being called the "thickness" hereinafter) may be set as desired, but can be set in the range of 0.5 [mm] to 1 [mm] inclusive, for example. The dimension of the conductor plate 31 in a width direction (this direction being the direction perpendicular to the lengthwise direction and the thickness direction and corresponding to a ±Y direction in FIG. 1, and this dimension simply being called the "width" hereinafter) may be set as desired, but can be set in the range of 50 [mm] to 100 [mm] inclusive, for example.

The conductor plate 31 is formed by an electrically conductive material. For example, a metal such as copper, a copper alloy, aluminum, or an aluminum alloy can be applied as the material for forming the conductor plate 31. The conductor plate 31 can function as a wire as will be described later.

The shape of, the size of, and examples of the material that forms the conductor plate 32 are similar to those of the conductor plate 31, and therefore a redundant description will not be given for them. The conductor plate 32 can also function as a wire as will be described later.

The conductor plates 31 and 32 are arranged so as to face each other while also being separated from each other in the thickness direction. The conductor plates 31 and 32 extend in the same direction, and have substantially the same lengthwise direction, thickness direction, and width direction.

The insulating sheath 310 covers the outer surface (the entire circumference) of the conductor plate 31 in at least the module cross-section. Similarly, the insulating sheath 320 covers the outer surface (the entire circumference) of the conductor plate 32 in at least the module cross-section. The concepts of an upper surface, a lower surface, and side surfaces of the conductor plates 31 and 32 will be introduced in the following description. The upper surface is the surface that is located on one side in the thickness direction (+Z side), and the lower surface is the surface that is located on the other side in the thickness direction (−Z side). The side surfaces are the surfaces that are located on the two sides in the width direction (±Y sides) and that connect the upper surface and the lower surface. Accordingly, the insulating sheath 310 covers the upper surface, the lower surface, and the two side surfaces of the conductor plate 31. The insulating sheath 320 covers the upper surface, the lower surface, and the two side surfaces of the conductor plate 32. Also, the conductor plates 31 and 32 are stacked in the thickness direction (Z direction) thereof such that the lower surface of the insulating sheath 310 is in contact with the upper surface of the insulating sheath 320.

The insulating sheaths 310 and 320 are formed from an insulating material. The material that forms the insulating sheaths 310 and 320 may be selected as desired. For example, a resin can be applied as the material that forms the insulating sheaths 310 and 320.

According to the insulating sheaths 310 and 320, it is possible to ensure insulation between the conductor plates 31 and 32, while also ensuring that the conductor plates 31 and 32 are each insulated from the outside.

Figure 2:
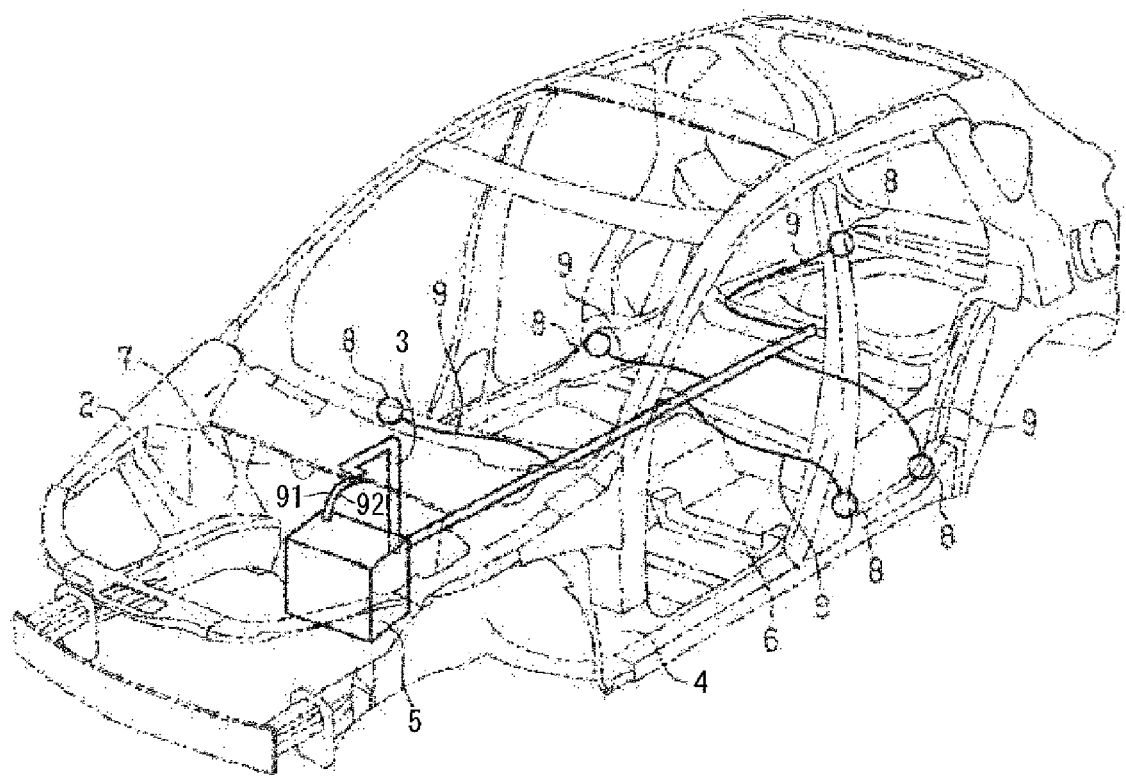
FIG. 2 is a diagram schematically showing an example of a routing aspect of the metal wire inside a vehicle.

FIG. 2 is a diagram schematically showing an example of a routing aspect of the metal wire 3 inside a vehicle. In the example in FIG. 2, a vehicle body 4 (so-called body) of the vehicle is indicated by dashed double-dotted lines.

The metal wire 3 is routed inside the vehicle in a manner in which insulation from the vehicle body 4 is ensured. Specifically, the metal wire 3 passes through a partition wall 7, which separates an engine room 2 from a vehicle compartment 6, and extends into the vehicle compartment 6. The metal wire 3 further extends downward along the partition wall 7 inside the vehicle compartment 6, and then extends toward the back of the vehicle body 4 over the central portion of the floor of the vehicle compartment 6. Also, loads 8 arranged in the vehicle body 4 are connected to closest portions of the metal wire 3 via wires 9.

An electrical storage device 5 is disposed in the engine room 2 of the vehicle body 4 of the automobile. The electrical storage device 5 is a battery (e.g., a lead battery or a lithium-ion battery) or a capacitor, for example. The electrical storage device 5 includes a low-potential (minus) output terminal and a high-potential (plus) output terminal, and the direct current voltage across the output terminals is output. Note that the electrical storage device 5 may be arranged in a portion other than the engine room 2 inside the vehicle.

The conductor plate 31 is electrically connected to the low-potential output terminal of the electrical storage device 5 via a wire 91 for example. Specifically, one end of the wire 91 is connected to the low-potential output terminal of the electrical storage device 5, and the other end is connected to the conductor plate 31. The conductor plate 31 and the wire 91 may be connected using any suitable technique. For example, a portion of the insulating sheath 310 is removed to expose a portion of the conductor plate 31, and a conductor portion (e.g., a core wire or a terminal) on one end side of the wire 91 is connected and fixed to the exposed portion of the conductor plate 31. Any suitable technique may be used for such fixing. For example, it is possible to apply a fixing method that employs a screw, solder, an electrically-conductive adhesive, or the like.

The conductor plate 32 is electrically connected to the high-potential output terminal of the electrical storage device 5 via a wire 92 for example. Specifically, one end of the wire 92 is connected to the high-potential output terminal of the electrical storage device 5, and the other end is connected to the conductor plate 32. The conductor plate 32 and the wire 92 are connected to each other similarly to the conductor plate 31 and the wire 91, and therefore a redundant description will not be given for this.

Ends of the wires 9 on one side are connected to a portion of the metal wire 3 at a predetermined position in the lengthwise direction thereof. The conductor plates 31 and 32 of the metal wire 3 and the wires 9 are connected to each other similarly to the conductor plate 31 and the wire 91, and therefore a redundant description will not be given for this. The other ends of the wires 9 are connected to corresponding loads 8. Examples of the loads 8 include electrical devices such as an electric motor and an ECU (Electronic Control Unit) that includes a control circuit.

In this kind of power supply system, electrical power from the electrical storage device 5 is supplied to the loads 8 via the wires 91 and 92, the conductor plates 31 and 32, and the wires 9. In other words, the conductor plates 31 and 32 can function as wires. Also, in the example in FIG. 2, the wires 91 and 92 and the wires 9 can be considered to be a wire harness, and therefore the metal wire 3 also functions as a connection module for connection to the wire harness.

As described above, in this metal wire 3, the conductor plates 31 and 32 face each other in the thickness direction. This makes it possible to effectively suppress noise that is generated by current flowing through the conductor plates 31 and 32. Specifically, the direction of the current flowing through the conductor plate 31 is opposite to the direction of the current flowing through the conductor plate 32, and therefore the magnetic fluxes generated by such current cancel each other out. This makes it possible to suppress electromagnetic noise.

Also, in this metal wire 3, the conductor plates 31 and 32 are respectively covered by the insulating sheaths 310 and 320, thus making it possible to ensure that the conductor plates 31 and 32 are insulated from the outside. Accordingly, even if an electrically-conductive member is arranged in the vicinity of the conductor plates 31 and 32, it is possible to suppress the leakage of current from the conductor plates 31 and 32 to that member. Accordingly, an increase in power consumption can be suppressed.

Note that although one electrical storage device 5 is shown in the example in FIG. 2, a plurality of electrical storage devices 5 may be provided. In this case, the output terminals of the electrical storage devices 5 may each be connected to the conductor plates 31 and 32.

Configuration of Shape Maintaining Tool 1

The following describes a shape maintaining tool 1 for routing the plate-shaped metal wire 3.

Figure 3:
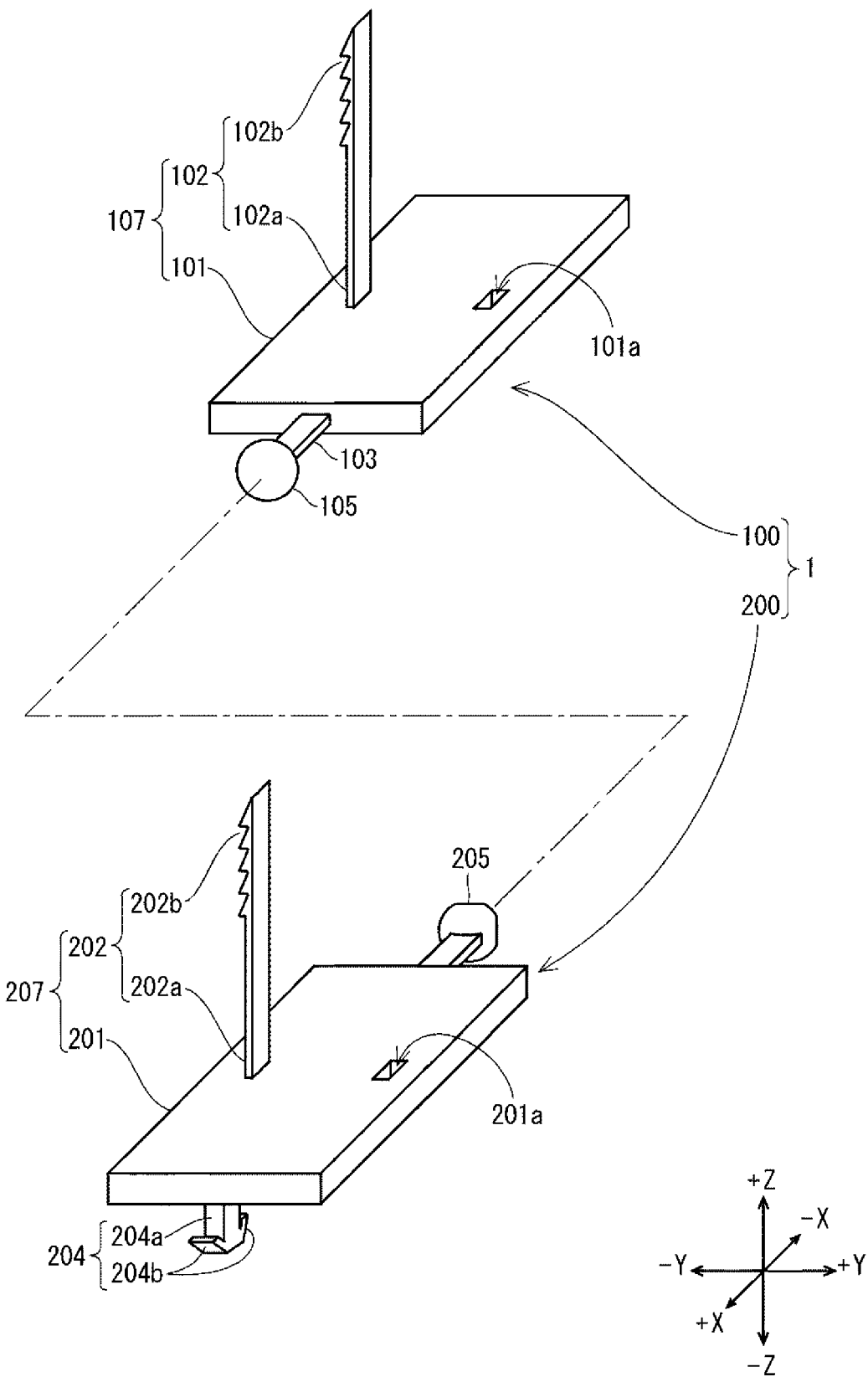
FIG. 3 is a perspective view schematically showing the structure of a shape maintaining tool.

FIG. 3 is a perspective view schematically showing the structure of a first member 100 and a second member 200 that constitute the shape maintaining tool 1. The first member 100 and the second member 200 are separate members and are coupled to each other along a virtual line that is indicated by a dashed-dotted line. This coupling will be described in detail later.

The first member 100 has a first holding portion 107 for holding the metal wire 3, and also has a first coupling portion 105 that is to be fixed to the first holding portion 107.

The first holding portion 107 has a plate-shaped first base portion 101 and a first band portion 102 for holding the metal wire 3 along with the first base portion 101. In FIG. 3, the first base portion 101 is arranged extending along the XY plane.

A hole 101*a* is provided on one side (+Y side) of the first base portion 101. The hole 101*a* is a through-hole that passes through the first base portion 101 in a tangential direction with respect to the main surface thereof (i.e., the Z axis direction).

The first band portion 102 is provided on the other side (−Y side) of the first base portion 101. The first band portion 102 has one end (called an end portion 102*a*) that is fixed to the main surface on one side (+Z side) of the first base portion 101, and another end (called an end portion 102*b*) that is a free end and is located on the side opposite to the end portion 102*a*. In other words, the first band portion 102 is a portion that extends from the main surface on one side (+Z side) of the first base portion 101.

The cross-sectional volume of the first band portion 102 in a cross-section orthogonal to the extending direction thereof is substantially the same as, or smaller than, the opening area of the hole 101*a*, and the end portion 102*b* of the first band portion 102 can be passed through the hole 101*a*.

The metal wire 3 is arranged between the main surface of the first base portion 101 and the first band portion 102 in the thickness direction, and the end portion 102*b* of the first band portion 102 is passed through the hole 101*a*. Accordingly, the first holding portion 107 holds the metal wire 3 in a state where the metal wire 3 is surrounded by the first base portion 101 and the first band portion 102. Specifically, the first holding portion 107 holds the metal wire 3 in a state of constricting the metal wire 3 in the thickness direction thereof. In this way, the first base portion 101 is a portion for placement of the metal wire 3, and the hole 101*a* is a portion for fixing the end portion 102*b* of the first band portion 102 that is wrapped around the metal wire 3.

The end portion 102*b* of the first band portion 102 has a multi-level shape including a plurality of inclined portions that extend in the thickness direction and are arranged side-by-side along the extending direction from the leading end side, which is the side opposite to the first base portion 101, toward the first base portion 101 side. Accordingly, the thick portions of the inclined portions are inserted into the hole 101*a* from the main surface on the one side (+Z side) of the first base portion 101 and become locked to the main surface on the other side (−Z side), thus maintaining the state in which the first holding portion 107 holds the metal wire 3.

In the state where the metal wire 3 is held by the first holding portion 107 in this way, in the example in FIG. 3 for example, the lengthwise direction of the metal wire 3 matches the X axis direction, the width direction of the metal wire 3 matches the Y axis direction, and the thickness direction of the metal wire 3 matches the Z axis direction.

A first projection portion 103 is provided on a peripheral portion of the first base portion 101 at a location on one side (+X side) in the lengthwise direction of the metal wire 3, and the first projection portion 103 projects from the first base portion 101 in the direction corresponding to the one side (+X side). A base end portion of the first projection portion 103 on the first base portion 101 side (−X side) thereof is fixed to the first base portion 101, and a leading end portion of the first projection portion 103 on the side opposite to the first base portion 101 (i.e., on the +X side) is fixed to the first coupling portion 105. In other words, the first projection portion 103 functions as a holding portion for fixing and holding the first coupling portion 105 to the first base portion 101. The first coupling portion 105 is thus fixed to the first holding portion 107.

The first coupling portion 105 is a ball-shaped supported portion, and is supported by a second coupling portion 205. The first base portion 101, the first projection portion 103, and the first coupling portion 105 are components that are obtained by monolithic molding of resin for example.

The second member 200 has a second holding portion 207 for holding the metal wire 3, the second coupling portion 205 that is fixed to the second holding portion 207, and a second fixing portion 204 for fixing the second holding portion 207 to a fixing target of the vehicle.

The second holding portion 207 has a plate-shaped second base portion 201 and a second band portion 202 for holding the metal wire 3 along with the second base portion 201. In FIG. 3, the second base portion 201 is arranged extending along the XY plane.

A hole 201*a* is provided on one side (+Y side) of the second base portion 201. The hole 201*a* is a through-hole that passes through the second base portion 201 in a tangential direction with respect to the main surface thereof (i.e., the Z axis direction).

The second band portion 202 is provided on the other side (−Y side) of the second base portion 201. The second band portion 202 has one end (called an end portion 202*a*) that is fixed to the main surface on one side (+Z side) of the second base portion 201, and another end (called an end portion 202*b*) that is a free end and is located on the side opposite to the end portion 202*a*. In other words, the second band portion 202 is a portion that extends from the main surface on one side (+Z side) of the second base portion 201.

The cross-sectional volume of the second band portion 202 in a cross-section orthogonal to the extending direction thereof is substantially the same as, or smaller than, the opening area of the hole 201*a*, and the end portion 202*b* of the second band portion 202 can be passed through the hole 201*a*.

The metal wire 3 is arranged between the main surface of the second base portion 201 and the second band portion 202 in the thickness direction, and the end portion 202*b* of the second band portion 202 is passed through the hole 201*a*. Accordingly, the second holding portion 207 holds the metal wire 3 in a state where the metal wire 3 is surrounded by the second base portion 201 and the second band portion 202. Specifically, the second holding portion 207 holds the metal wire 3 in a state of constricting the metal wire 3 in the thickness direction thereof. In this way, the second base portion 201 is a portion for placement of the metal wire 3, and the hole 201a is a portion for fixing the end portion 202b of the second band portion 202 that is wrapped around the metal wire 3.

The end portion 202b of the second band portion 202 has a multi-level shape including a plurality of inclined portions that extend in the thickness direction and are arranged side-by-side along the extending direction from the leading end side, which is the side opposite to the second base portion 201, toward the second base portion 201 side. Accordingly, the thick portions of the inclined portions are inserted into the hole 201a from the main surface on the one side (+Z side) of the second base portion 201 and become locked to the main surface on the other side (−Z side), thus maintaining the state in which the second holding portion 207 holds the metal wire 3.

In the state where the metal wire 3 is held by the second holding portion 207 in this way, in the example in FIG. 3 for example, the lengthwise direction of the metal wire 3 matches the X axis direction, the width direction of the metal wire 3 matches the Y axis direction, and the thickness direction of the metal wire 3 matches the Z axis direction.

The second fixing portion 204 is coupled to the second base portion 201 on the side opposite to the second band portion 202 (i.e., on the −Z side), and is a portion that is to be fixed to a fixing target 10. More specifically, the second fixing portion 204 is an anchoring portion (so-called clamp) that protrudes from the main surface of the second base portion 201 to one side (−Z side) in a tangential direction with respect to the main surface, and is a portion for attachment to a hole 10a provided in the fixing target 10 (e.g., the vehicle body 4).

The second fixing portion 204 includes a column portion 204a and lock portions 204b. The column portion 204a is shaped as a column that extends in a tangential direction (Z axis direction) with respect to the main surface of the second base portion 201, and is configured to be able to pass through the hole 10a of the fixing target 10. The lock portions 204b are provided at the end portion of the column portion 204a that is on the side distant from the second base portion 201 (hereinafter, this end portion being called the leading end portion), and have a larger diameter than the column portion 204a. The column portion 204a is configured to be capable of being locked to the peripheral portion of the hole 10a of the fixing target 10 after being inserted into the hole 10a. More specifically, the pair of lock portions 204b extend from the leading end portion of the column portion 204a in a direction outward and toward the second base portion 201. The pair of lock portions 204b are formed so as to be capable of elastically deforming inward and outward. When the second fixing portion 204 is pressed into the hole 10a of the fixing target 10, the outer surfaces of the pair of lock portions 204b come into contact with the inner peripheral portion of the hole 10a of the fixing target 10 and elastically deform inward. When the second fixing portion 204 is then inserted farther into the hole 10a of the fixing target 10 until the pair of lock portions 204b pass over the inner peripheral portion of the hole 10a of the fixing target 10, the pair of lock portions 204b then return to their original shape due to restoring force. Accordingly, the pair of lock portions 204b are locked to the peripheral portion of the hole 10a of the fixing target 10, and the second member 200 is fixed to the fixing target 10.

A second projection portion 203 is provided on a peripheral portion of the second base portion 201 at a location on one side (−X side) in the lengthwise direction of the metal wire 3 that is to be held by the second holding portion 207, and the second projection portion 203 projects from the second base portion 201 in the direction corresponding to the one side (−X side). A base end portion of the second projection portion 203 on the second base portion 201 side (+X side) thereof is fixed to the second base portion 201, and a leading end portion of the second projection portion 203 on the side opposite to the second base portion 201 (i.e., on the −X side) is fixed to the second coupling portion 205. In other words, the second projection portion 203 functions as a holding portion for fixing and holding the second coupling portion 205 to the second base portion 201. The second coupling portion 205 is thus fixed to the second holding portion 207.

The second coupling portion 205 is a concave support portion that has an inner space 206 capable of housing the first coupling portion 105. Specifically, the curvature of the outer circumferential surface of the first coupling portion 105 and the curvature of the inner circumferential surface of the second coupling portion 205 (can also be called the border of the inner space 206) are approximately the same. Accordingly, when the first coupling portion 105 is housed in the inner space 206 of the second coupling portion 205, the outer circumferential surface of the first coupling portion 105 and the inner circumferential surface of the second coupling portion 205 are in close contact with each other, and the first coupling portion 105 is rotatably supported to the second coupling portion 205.

Figure 4:
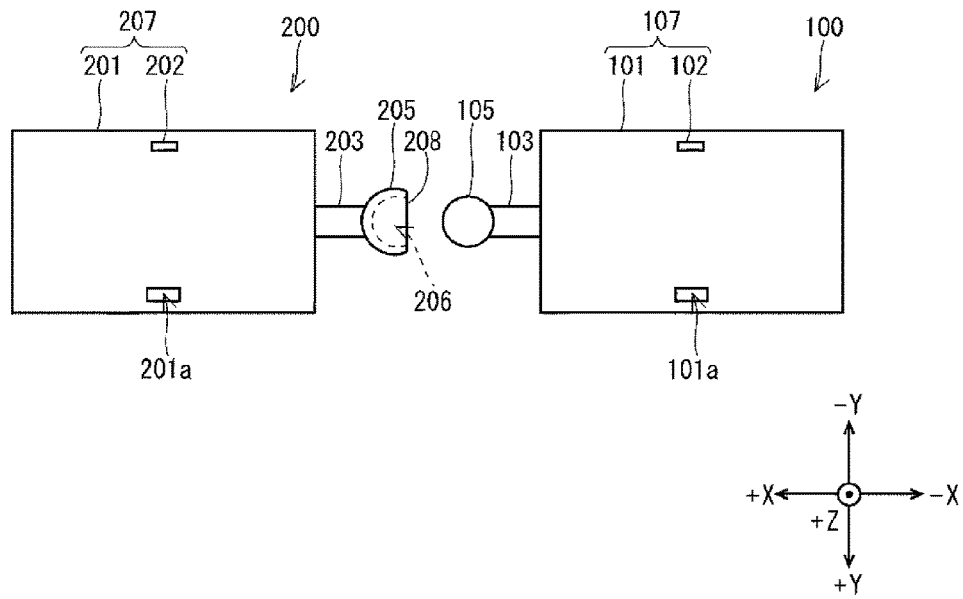
FIG. 4 is a plan view schematically showing a first coupling portion and a second coupling portion in an disconnected state.
Figure 5:
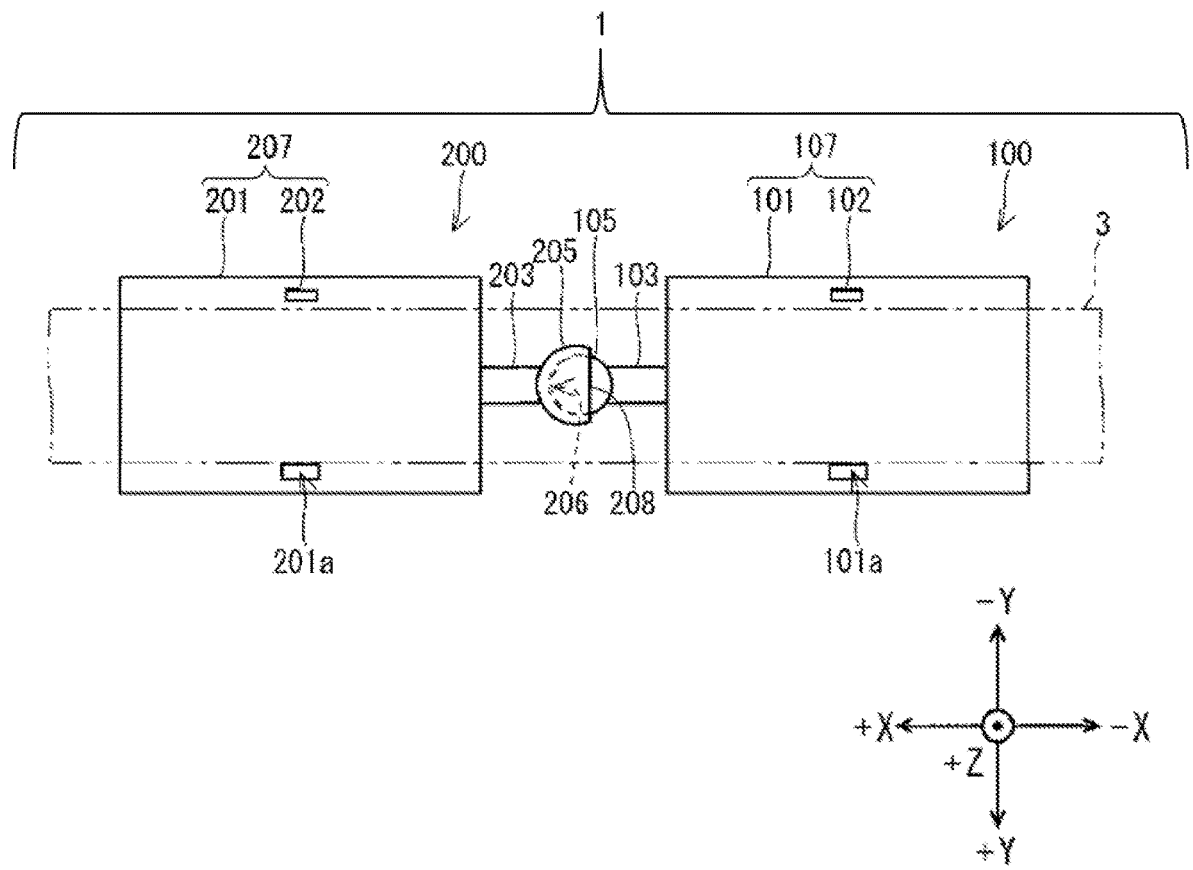
FIG. 5 is a plan view schematically showing the first coupling portion and the second coupling portion in a coupled state.

FIG. 4 is an XY planar view schematically showing the first coupling portion 105 and the second coupling portion 205 in a disconnected state. FIG. 5 is an XY planar view schematically showing the first coupling portion 105 and the second coupling portion 205 in a coupled state.

An open portion 208 exists in the second coupling portion 205, and the inner space 206 is in communication with the outside of the second coupling portion 205 via the open portion 208. When the first coupling portion 105 and the second coupling portion 205 are to be coupled, as shown in FIG. 4, the first member 100 and the second member 200 are arranged such that the open portion 208 of the second coupling portion 205 faces the first coupling portion 105. The two portions are brought together, and the first coupling portion 105 is inserted into the inner space 206 via the open portion 208. At this time, the open portion 208 elastically deforms so as to widen, and then contracts after allowing the first coupling portion 105 to pass, and then the peripheral portion of the open portion 208 engages with the first base portion 101 side of the first coupling portion 105, and thus the first member 100 and the second member 200 are coupled to each other. The state in which the first member 100 and the second member 200 are coupled together and constitute the shape maintaining tool 1 will hereinafter be called the coupled state.

This coupling is performed by an operator manually bringing the first member 100 and the second member 200 together, for example. As described above, in the coupled state, the outer circumferential surface of the first coupling portion 105 and the inner circumferential surface of the inner space 206 are in close contact with each other, and as long as a certain extent of external force or more is not applied, the orientation of the shape maintaining tool 1 (i.e., the coupling angle of the first member 100 and the second member 200) is maintained by frictional force generated by the two circumferential surfaces. However, if a certain extent of external force or more is applied by the operator, the first coupling portion 105 and the second coupling portion 205 rotate, and the orientation of the shape maintaining tool 1 (i.e., the coupling angle of the first member 100 and the second member 200) changes.

In particular, in the present embodiment, the outer circumferential surface of the first coupling portion 105 and the inner circumferential surface of the second coupling portion 205 are both spherical surfaces, and therefore, the first coupling portion 105 and the second coupling portion 205 are coupled so as to be able to rotate about three orthogonal axes. Specifically, the first coupling portion 105 and the second coupling portion 205 can rotate about axes that extend in the lengthwise direction (the X axis direction in the example in FIG. 1), the width direction (the Y axis direction in the example in FIG. 1), and the thickness direction (the Z axis direction in the example in FIG. 1) of the metal wire 3 that is held by both the first holding portion 107 and the second holding portion 207. Accordingly, the orientation of the shape maintaining tool 1 (i.e., the coupling angle of the first member 100 and the second member 200) can be changed with a high degree of freedom.

Before performing the operation of attaching the shape maintaining tool 1 to the metal wire 3 (i.e., the operation of fixing the metal wire 3 with the first holding portion 107 and the second holding portion 207), the operator performs processing for adjusting the orientation of the metal wire 3. In this orientation adjustment processing, the metal wire 3 is subjected to bending and the like while being routed. The following describes a case in which, as shown in FIGS. 6 and 7, due to the orientation adjustment processing, the metal wire 3 is bent to a predetermined angle (e.g., 30 degrees) at a predetermined position with the width direction (Y axis direction) serving as the bending axis.

Figure 6:
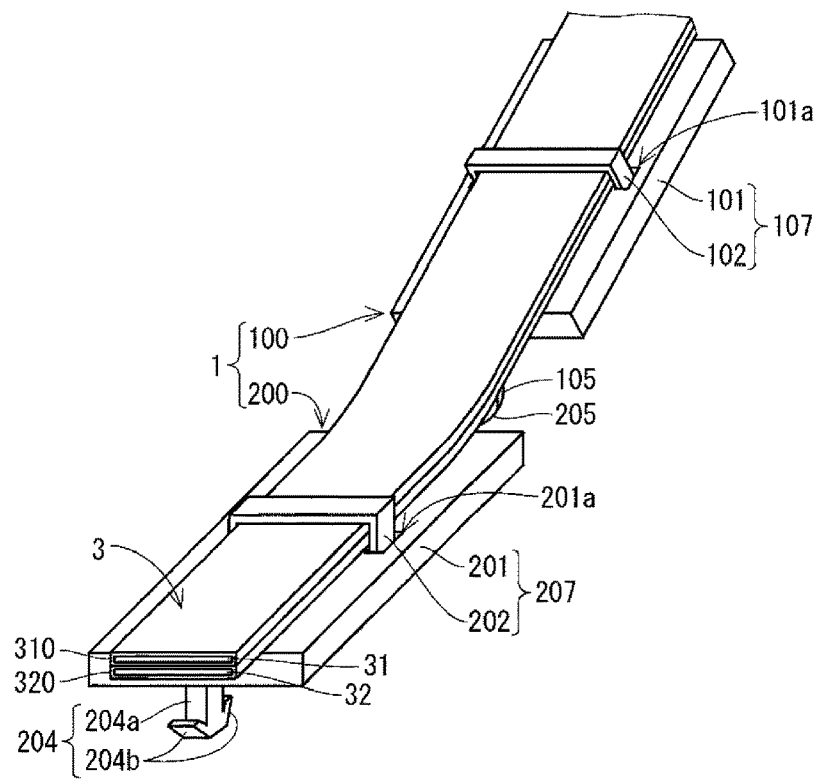
FIG. 6 is a perspective view schematically showing a state in which the shape maintaining tool has been attached to the metal wire.
Figure 6:
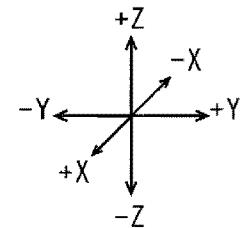
Figure 7:
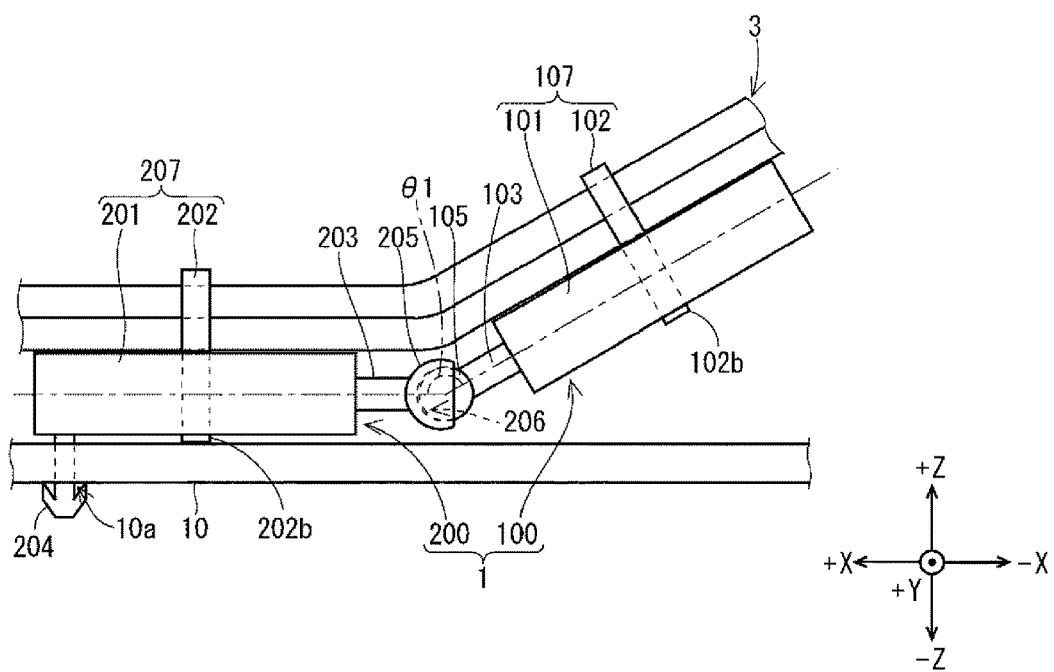
FIG. 7 is a plan view schematically showing a state in which the shape maintaining tool has been attached to the metal wire.

FIG. 6 is a perspective view schematically showing a state in which the shape maintaining tool 1 has been attached to the metal wire 3. FIG. 7 is an XZ planar view schematically showing the state in which the shape maintaining tool 1 has been attached to the metal wire 3.

Before attaching the shape maintaining tool 1 to the metal wire 3, the operator adjusts the orientation of the shape maintaining tool 1 by adjusting the coupling angle of the first coupling portion 105 and the second coupling portion 205. Specifically, the operator adjusts the orientation of the shape maintaining tool 1 so as to be substantially the same as the orientation of the metal wire 3. In the illustrated example, the metal wire 3 is in an orientation of being bent 30 degrees about the Y axis, which is the width direction, and therefore the coupling angle of the first coupling portion 105 and the second coupling portion 205 is adjusted to an angle $\theta 1$ to achieve an orientation in which the shape maintaining tool 1 is also bent 30 degrees about the Y axis. This angle $\theta 1$ is an angle less than or equal to 180 degrees in the range of angles formed by the extending directions of the first base portion 101 and the second base portion 201 (see the dashed-dotted lines in FIG. 7). FIG. 7 shows an example of the case where the angle $\theta 1$ is 150 degrees in the XZ plane. Hereinafter, the processing for adjusting the orientation of the shape maintaining tool 1 so as to match the orientation of the metal wire 3 will be called shape maintaining tool 1 orientation adjustment processing.

Thereafter, the operator brings the metal wire 3 and the shape maintaining tool 1 together such that the main surface of the metal wire 3 on one side (the fixing target 10 side in FIG. 7) in portions before and after the bend come into contact with the main surfaces on one side (the side opposite to the fixing target 10 in FIG. 7) of the first base portion 101 and the second base portion 201. The operator then inserts the first band portion 102 into the hole 101a of the first base portion 101 and inserts the second band portion 202 into the hole 201a of the second base portion 201 as described above. Accordingly, the metal wire 3 is constricted in the thickness direction thereof by the first holding portion 107 and the second holding portion 207, and the shape maintaining tool 1 is attached to the metal wire 3.

Thereafter, the operator passes the second fixing portion 204 of the shape maintaining tool 1, which is attached to the metal wire 3, through the hole 10a of the fixing target 10. Accordingly, the operator can easily maintain the bent shape of the metal wire 3 with use of the shape maintaining tool 1, and a portion of the metal wire 3 that is in the vicinity of the bend can be fixed to the fixing target 10 (see FIG. 7).

Note that although the end portion 202b of the second band portion 202 abuts against the fixing target 10 in the example shown in FIG. 7, if the end portion 202b of the second band portion 202 can possibly be a hindrance when fixing the shape maintaining tool 1 to the fixing target 10, the end portion 202b may be removed (e.g., cut away) before such fixing.

As long as at least either the first member 100 or the second member 200, which constitute the shape maintaining tool 1, has a portion that is to be fixed to the fixing target 10, the metal wire 3 can be fixed to the fixing target 10 in a state where the orientation of the metal wire 3 is maintained by the shape maintaining tool 1.

The present embodiment gives an example of the case where the first member 100 does not have a fixing portion that is to be fixed to the fixing target 10, and the second member 200 has the second fixing portion 204 that is to be fixed to the fixing target 10. In this case, it is preferable that one portion of an extending surface defined by the lengthwise direction and the width direction of the metal wire 3 (a portion on the side held by the second holding portion 207) is parallel with an extending surface of the fixing target 10, and that another portion of the extending surface defined by the lengthwise direction and the width direction of the metal wire 3 (a portion on the side held by the first holding portion 107) is not parallel with the extending surface of the fixing target 10). This is because the metal wire 3 can be routed such that the extending surfaces of the aforementioned one portion, the second base portion 201, and the fixing target 10 are parallel with each other, and the orientations of these portions are likely to be stable after routing.

Figure 8:
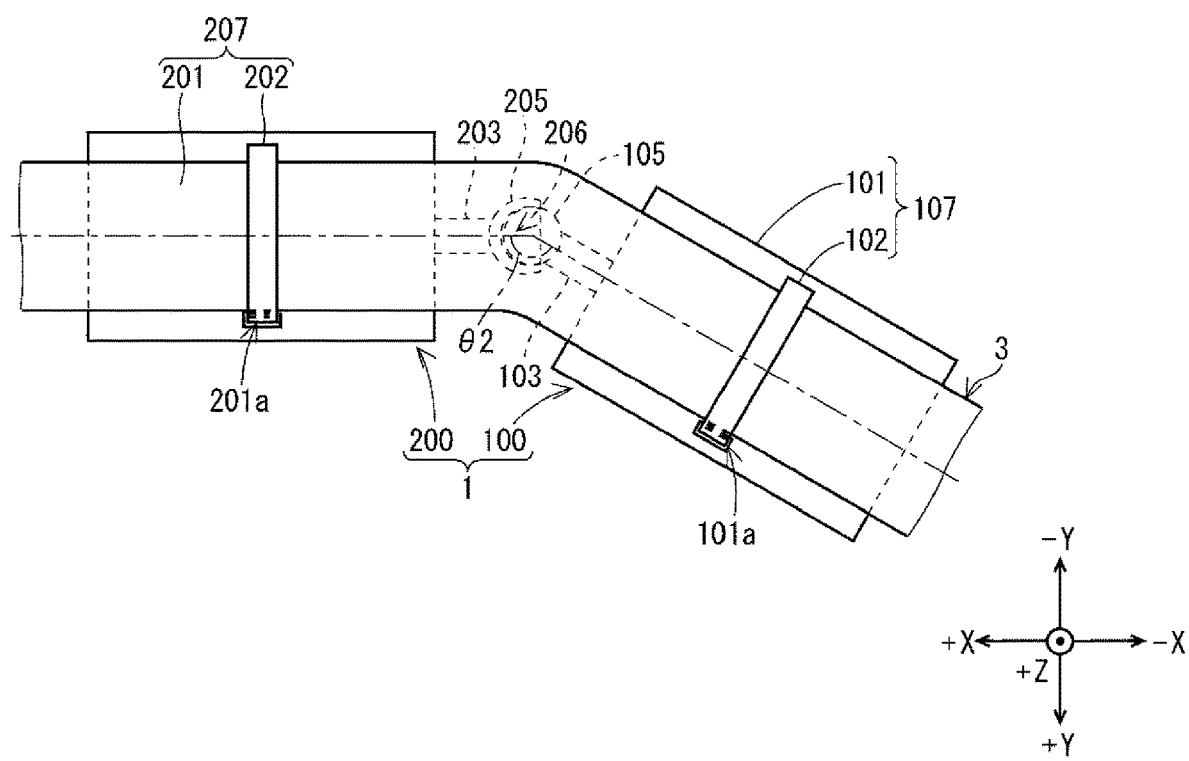
FIG. 8 is a plan view schematically showing a state in which the shape maintaining tool has been attached to the metal wire.

FIG. 8 is an XY planar view schematically showing a state in which the shape maintaining tool 1 has been attached to the metal wire 3 in a different routing aspect from FIG. 7. In the routing aspect shown in FIG. 8, the metal wire 3 is held by both the first holding portion 107 and the second holding portion 207 and is bent at a predetermined position with the thickness direction (Z axis direction) serving as the bending axis, and the shape maintaining tool 1 maintains the bent shape of the routed metal wire 3.

In this routing aspect as well, similarly to the above description, the operator performs processing for adjusting the orientation of the metal wire 3 and processing for adjusting the orientation of the shape maintaining tool 1, and then fixes the metal wire 3 with the first holding portion 107 and the second holding portion 207. In the processing for adjusting the orientation of the shape maintaining tool 1, the operator adjusts the coupling angle of the first coupling portion 105 and the second coupling portion 205 to an angle $\theta 2$. This angle $\theta 2$ is an angle less than or equal to 180 degrees in the range of angles formed by the extending directions of the first base portion 101 and the second base portion 201 (see the dashed-dotted lines in FIG. 8). FIG. 8 shows an example of the case where the angle $\theta 2$ is 150 degrees in the XY plane. Subsequently, the operator passes the second fixing portion 204 of the shape maintaining tool 1, which is attached to the metal wire 3, through the hole 10a of the fixing target 10. Accordingly, the operator can easily maintain the bent shape of the metal wire 3 with use of the shape maintaining tool 1, and a portion of the metal wire 3 that is in the vicinity of the bend can be fixed to the fixing target 10.

Although not illustrated, the shape maintaining tool 1 can maintain a shape of the routed metal wire 3, which is held by both the first holding portion 107 and the second holding portion 207, in which the metal wire 3 is twisted at a predetermined position with the lengthwise direction (X axis direction) serving as the twisting axis.

In this way, the shape maintaining tool 1 can maintain the shape of the routed metal wire 3, which is held by both the first holding portion 107 and the second holding portion 207, in which the metal wire 3 is bent at a predetermined position with the lengthwise direction, the width direction, or the thickness direction serving as the bending axis. Also, the shape maintaining tool 1 can maintain a shape of the routed metal wire 3 in which the metal wire 3 is bent with a combination of two or three directions among the lengthwise direction, the width direction, and the thickness direction serving as the bending axis, rather than merely one direction.

Second Embodiment

The following describes a shape maintaining tool 1A according to a second embodiment. Note that constituent elements in the following description that are the same between the shape maintaining tool 1A and the shape maintaining tool 1 are denoted by the same reference signs and will not be described redundantly.

Figure 9:
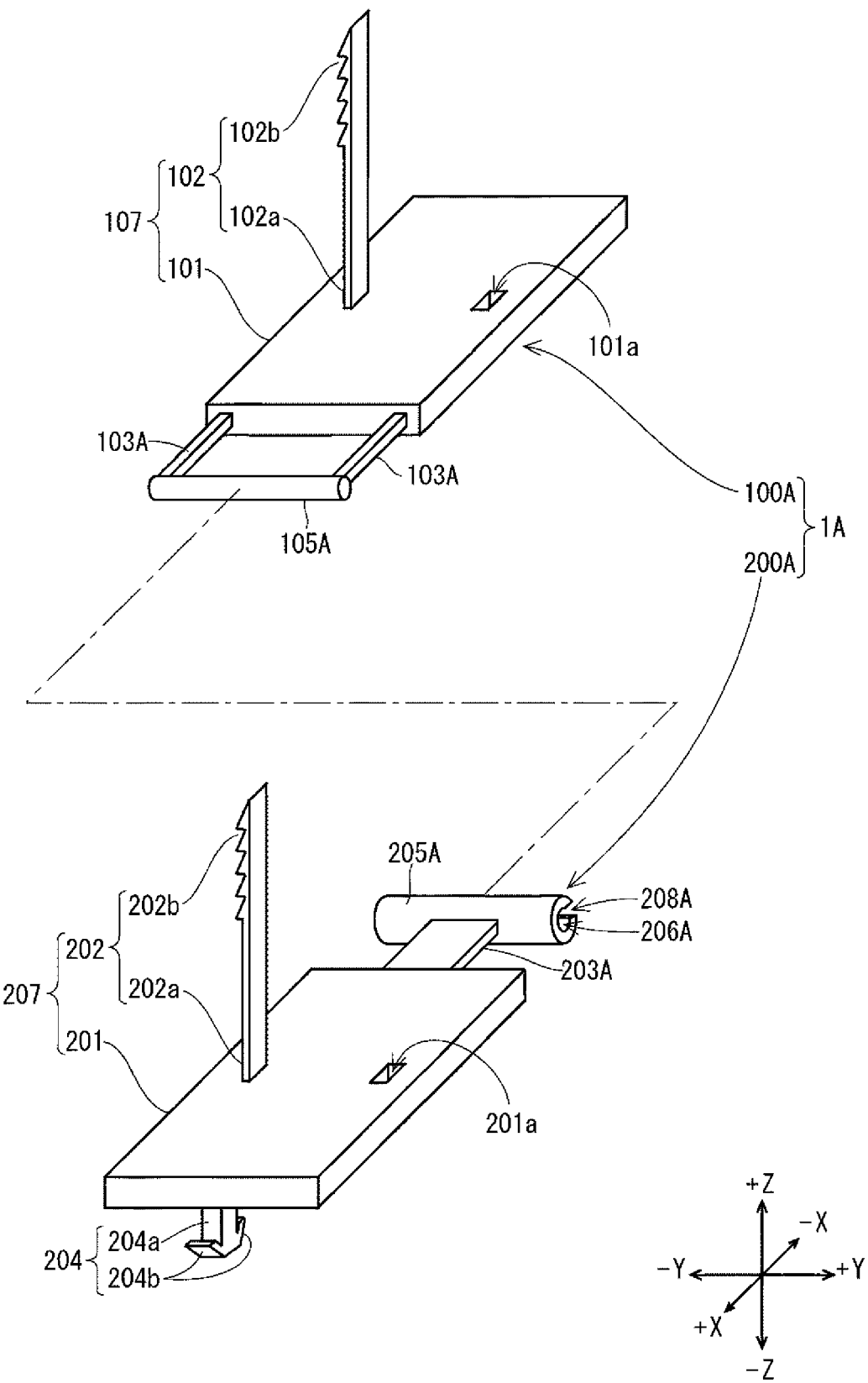
FIG. 9 is a perspective view schematically showing the structure of a shape maintaining tool.

FIG. 9 is a perspective view schematically showing the structure of a first member 100A and a second member 200A that constitute the shape maintaining tool 1A. The first member 100A and the second member 200A are separate members and are coupled to each other along a virtual line that is indicated by a dashed-dotted line. This coupling will be described in detail later.

The first member 100A has a first holding portion 107 for holding the metal wire 3 and a first coupling portion 105A that is fixed to the first holding portion 107.

Two first projection portions 103A are provided on a peripheral portion of the first base portion 101 at a location on one side (+X side) in the lengthwise direction of the metal wire 3, and the first projection portions 103A project from the first base portion 101 in the direction corresponding to the one side (+X side). The two first projection portions 103A are spaced apart along the width direction (Y axis direction) of the metal wire 3, the base end portions on the first base portion 101 side (−X side) of the two first projection portions 103A are fixed to the first base portion 101, and the leading end portions of the first projection portions 103A on the side opposite to the first base portion 101 (i.e., on the +X side) are fixed to the first coupling portion 105A. In other words, the first projection portions 103A function as a holding portion for fixing and holding the first coupling portion 105A to the first base portion 101. The first coupling portion 105A is thus fixed to the first holding portion 107.

The first coupling portion 105A is a supported portion that is shaped as a circular column whose central axis extends along the width direction (Y axis direction) of the metal wire 3 that is to be held by the first holding portion 107, and is a portion that is to be housed in an inner space 206A of a later-described second coupling portion 205A. The first base portion 101, the first projection portions 103A, and the first coupling portion 105A are components that are obtained by monolithic molding of resin for example.

The second member 200A has a second holding portion 207 for holding the metal wire 3, a second coupling portion 205A that is fixed to the second holding portion 207, and a second fixing portion 204 that is to be fixed to a fixing target 10 of the vehicle.

A second projection portion 203A is provided on a peripheral portion of the second base portion 201 at a location on one side (−X side) in the lengthwise direction of the metal wire 3 that is to be held by the second holding portion 207, and the second projection portion 203A projects from the second base portion 201 in the direction corresponding to the one side (−X side). A base end portion of the second projection portion 203A on the second base portion 201 side (+X side) thereof is fixed to the second base portion 201, and a leading end portion of the second projection portion 203A on the side opposite to the second base portion 201 (i.e., on the −X side) is fixed to the second coupling portion 205A. In other words, the second projection portion 203A functions as a holding portion for fixing and holding the second coupling portion 205A to the second base portion 201. The second coupling portion 205A is thus fixed to the second holding portion 207.

The second coupling portion 205A is a support portion that is shaped as a cylinder whose central axis extends along the width direction (Y axis direction) of the metal wire 3 that is to be held by the second holding portion 207. More specifically, the second coupling portion 205A has an inner space 206A capable of housing the first coupling portion 105A. Also, the curvature of the outer circumferential surface of the first coupling portion 105A and the curvature of the inner circumferential surface of the second coupling portion 205A (can also be called the border of the inner space 206A) are approximately the same. Accordingly, when the first coupling portion 105A is housed in the inner space 206A of the second coupling portion 205A, the outer circumferential surface of the first coupling portion 105A and the inner circumferential surface of the second coupling portion 205A are in close contact with each other, and the first coupling portion 105A and the second coupling portion 205A are coupled so as to be capable of rotating about a central axis AX that extends in the Y axis direction.

Figure 10:
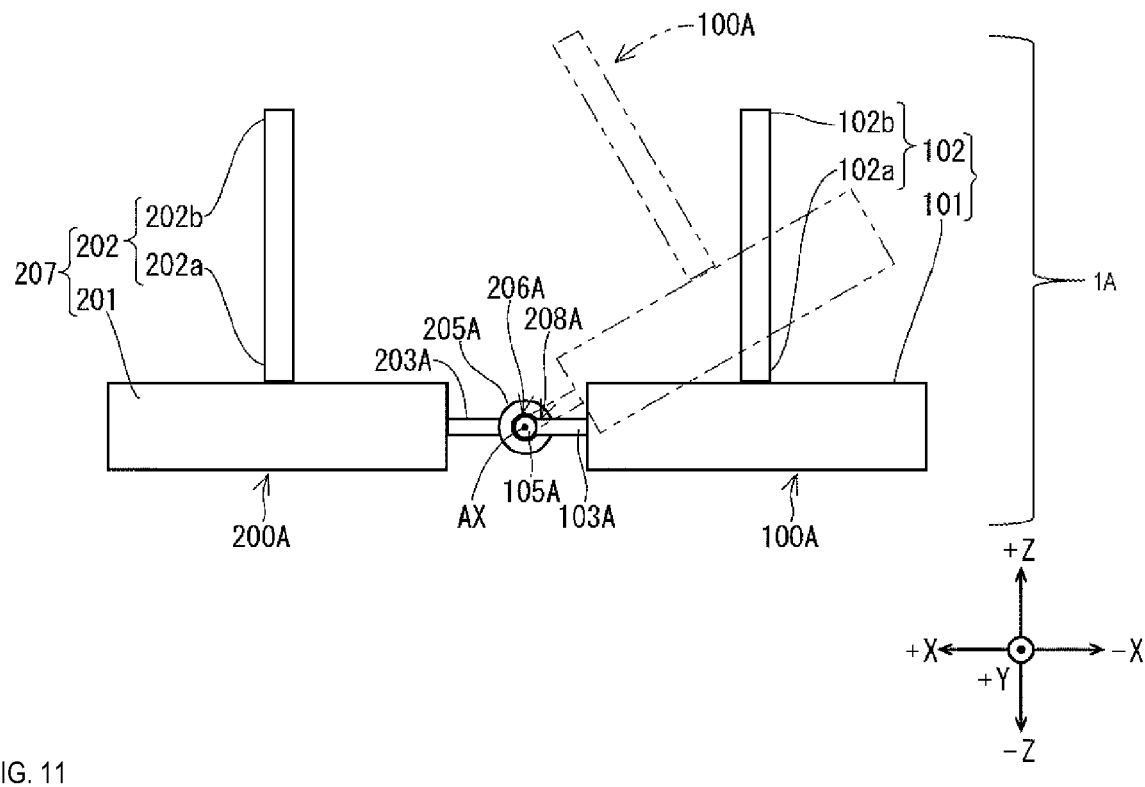
FIG. 10 is a plan view schematically showing a first coupling portion and a second coupling portion in a coupled state.

FIG. 10 is an XY planar view schematically showing the first coupling portion 105A and the second coupling portion 205A in a coupled state.

A slit-shaped open portion 208A that extends along the Y axis direction, which is parallel with the central axis AX, is provided in a circumferentially central portion of the second coupling portion 205A, and the inner space 206A is in communication with the outside of the second coupling portion 205A via the open portion 208A. When the first coupling portion 105A and the second coupling portion 205A are to be coupled, the first member 100A and the second member 200A are arranged such that the open portion 208A of the second coupling portion 205A faces the first coupling portion 105A.

The two portions are brought together, and the first coupling portion 105A is inserted into the inner space 206A via the open portion 208A. At this time, the open portion 208A elastically deforms so as to widen, and then contracts after allowing the first coupling portion 105A to pass, and then the peripheral portion of the open portion 208A engages with the first base portion 101 side of the first coupling portion 105A, and thus the first member 100A and the second member 200A are coupled to each other. The state in which the first member 100A and the second member 200A are coupled together and constitute the shape maintaining tool 1A will hereinafter be called the coupled state.

This coupling is performed by an operator manually bringing the first member 100A and the second member 200A together, for example. As described above, in the coupled state, the outer circumferential surface of the first coupling portion 105A and the inner circumferential surface of the second coupling portion 205A are in close contact with each other, and as long as a certain extent of external force or more is not applied, the orientation of the shape maintaining tool 1A (i.e., the coupling angle of the first member 100A and the second member 200A) is maintained by frictional force generated by the two circumferential surfaces. However, if a certain extent of external force or more is applied by the operator, the first coupling portion 105A and the second coupling portion 205A rotate, and the orientation of the shape maintaining tool 1A (i.e., the coupling angle of the first member 100A and the second member 200A) changes.

In particular, in the second embodiment, the outer circumferential surface of the first coupling portion 105A and the inner circumferential surface of the second coupling portion 205A are both approximately cylindrical, and therefore the first coupling portion 105A and the second coupling portion 205A are coupled so as to be capable of rotating about the central axis AX thereof. Here, the width direction of the metal wire 3 that is held by the first holding portion 107 and the second holding portion 207 is also the Y axis direction, and extends along the central axis AX. In other words, the first coupling portion 105A and the second coupling portion 205A can rotate about the axis that corresponds to the width direction of the metal wire 3 (i.e., the Y axis) that is held by both the first holding portion 107 and the second holding portion 207. The portions shown by solid lines in FIG. 10 show the shape maintaining tool 1A when maintaining the shape of the metal wire 3 that has not been bent with the width direction (Y axis direction) serving as the bending axis. Also, the portions shown by dashed double-dotted lines in FIG. 10 show the shape maintaining tool 1A when maintaining the shape of the metal wire 3 that has been bent with the width direction (Y axis direction) serving as the bending axis.

Figure 11:
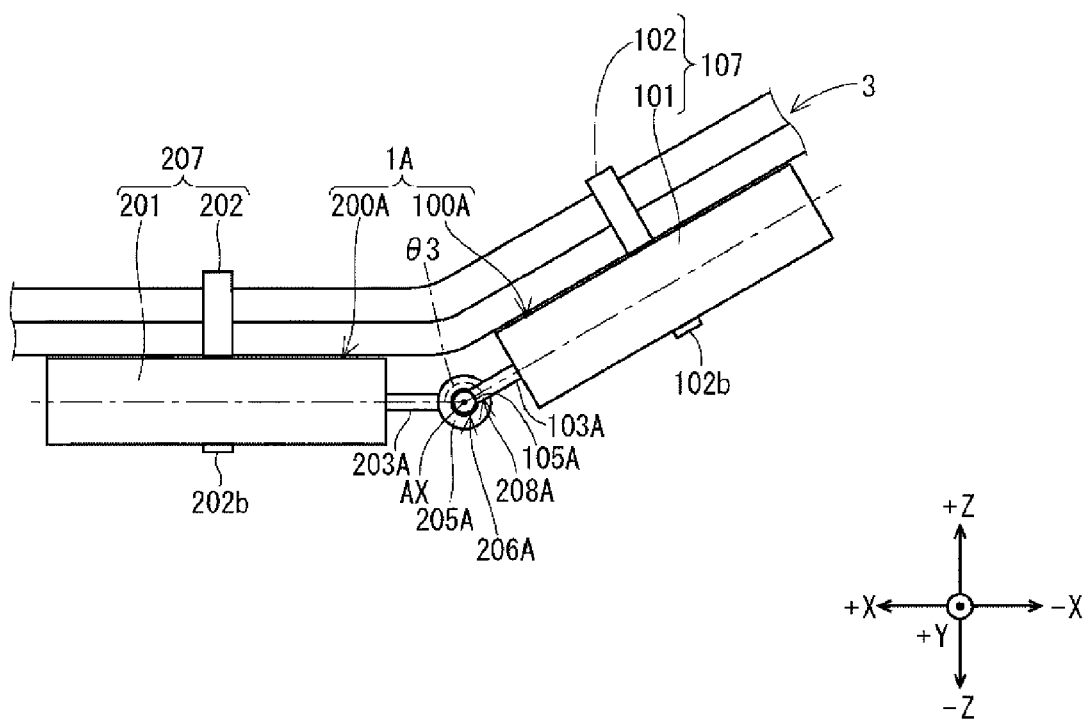
FIG. 11 is a plan view schematically showing a state in which the shape maintaining tool has been attached to the metal wire.

FIG. 11 is an XZ planar view schematically showing the state in which the shape maintaining tool 1A has been attached to the metal wire 3. In the routing aspect shown in FIG. 11 as well, similarly to the case of the first embodiment, the metal wire 3 is routed with use of the shape maintaining tool 1A in accordance with the following procedure. Specifically, the operator performs processing for adjusting the orientation of the metal wire 3 and processing for adjusting the orientation of the shape maintaining tool 1A, and then fixes the metal wire 3 with the first holding portion 107 and the second holding portion 207. In the processing for adjusting the orientation of the shape maintaining tool 1A, the operator adjusts the coupling angle of the first coupling portion 105A and the second coupling portion 205A to an angle θ3. This angle θ3 is an angle less than or equal to 180 degrees in the range of angles formed by the extending directions of the first base portion 101 and the second base portion 201 (see the dashed-dotted lines in FIG. 11). FIG. 11 shows an example of the case where the angle θ3 is 150 degrees in the XZ plane. Subsequently, the operator passes the second fixing portion 204 of the shape maintaining tool 1A, which is attached to the metal wire 3, through the hole 10a of the fixing target 10. Accordingly, the operator can easily maintain the bent shape of the metal wire 3 with use of the shape maintaining tool 1A, and a portion of the metal wire 3 that is in the vicinity of the bend can be fixed to the fixing target 10.

In this way, the shape maintaining tool 1A can maintain the shape of the routed metal wire 3, which is held by both the first holding portion 107 and the second holding portion 207, in which the metal wire 3 is bent at a predetermined position with the width direction (Y axis direction) serving as the bending axis. Normally, when the metal wire 3 is routed, there are more locations where the metal wire 3 is bent with the width direction serving as the bending axis than locations where the metal wire 3 is bent with the lengthwise direction or the thickness direction serving as the bending axis. Accordingly, the shape maintaining tool 1A, which has the first coupling portion 105A and the second coupling portion 205A that are coupled so as to be capable of rotating about at least the width direction of the metal wire 3, can be applied at the majority of the locations where the metal wire 3 is bent.

Variations

The above embodiments describe aspects in which the metal wire 3 is constituted by two conductor plates 31 and 32 that are stacked, but the metal wire 3 may be constituted by one conductor plate, or the metal wire 3 may be constituted by three or more conductor plates that are stacked.

Also, the above embodiments describe aspects in which the hole 101a is a through-hole that passes through the first band portion 102, and the hole 201a is a through-hole that passes through the second band portion 202, but it is sufficient that these holes are at least holes for insertion of the end portion 202b of the second band portion 202.

Figure 12:
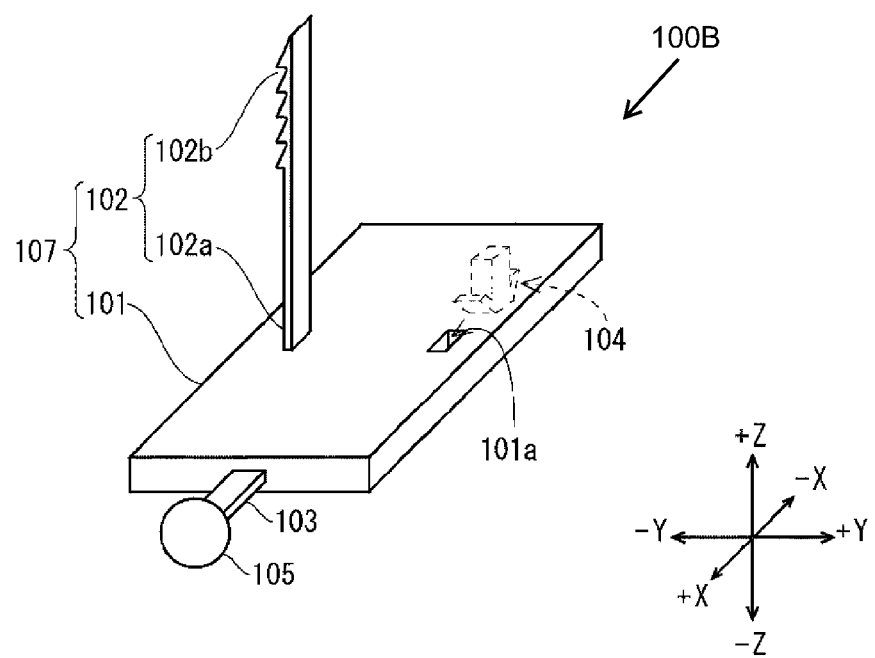
FIG. 12 is a perspective view schematically showing the structure of a first member.

FIG. 12 is a perspective view schematically showing the structure of a first member 100B according to a variation. In the shape maintaining tool 1 of the first embodiment described above, the first member 100B may be used in place of the first member 100. The first member 100B further includes a first fixing portion 104 in addition to the constituent elements of the first member 100. The first fixing portion 104 is a portion that has the same shape as the second fixing portion 204 of the second member 200, and is for being coupled to the first base portion 101 on the side opposite to the first band portion 102. As previously described in the first embodiment, as long as at least either the first member and the second member, which constitute the shape maintaining tool, has a fixing portion for being fixed to the fixing target 10, the metal wire 3 can be fixed to the fixing target 10 in a state where the orientation of the metal wire 3 is maintained by the shape maintaining tool.

Also, the method according to which the first fixing portion and the second fixing portion are fixed to the fixing target 10 is also not limited to the insertion of the above-described anchoring portion (so-called clamp). For example, a configuration is possible in which the first fixing portion and the second fixing portion are through-holes provided in the first base portion 101 and the second base portion 201, and the first fixing portion and the second fixing portion are fixed to the fixing target 10 by inserting bolts through such through-holes from one side and then performing fastening on the other side by screwing nuts to the bolts. Also, a configuration is possible in which the first fixing portion and the second fixing portion are weldable metal portions provided adjacent to the first base portion 101 and the second base portion 201, and the first fixing portion and the second fixing portion are fixed to the fixing target 10 by welding the metal portions to the fixing target 10.

Also, the first embodiment describes an aspect in which the first projection portion 103 fixes and holds the first coupling portion 105 to the first base portion 101, and the second projection portion 203 fixes and holds the second coupling portion 205 to the second base portion 201, but the first projection portion 103 and the second projection portion 203 may be omitted. In other words, the first coupling portion 105 may be directly fixed to the first base portion 101, and the second coupling portion 205 may be directly fixed to the second base portion 201. In this way, the first coupling portion 105 is directly or indirectly fixed to the first holding portion 107, and the second coupling portion 205 is directly or indirectly fixed to the second holding portion 207.

Also, after processing has been performed for adjusting the orientation of the shape maintaining tool 1 or 1A, an adhesive or the like may be applied to the first coupling portion 105 or 105A and the second coupling portion 205 or 205A in order to fix the positional relationship therebetween. Accordingly, the shape maintaining tool 1 or 1A is maintained in the adjusted orientation, and the metal wire 3, which is routed with use of the shape maintaining tool 1 or 1A can also be easily routed in a state where the adjusted orientation has been fixed. Also, instead of using an adhesive, the positional relationship between the first coupling portion 105 or 105A and the second coupling portion 205 or 205A may be fixed using various known mechanisms (e.g., a locking mechanism having a latch structure or the like).

The configurations described in the above embodiment and variations can be appropriately combined as long as no contradiction arises.

Although the shape maintaining tool has been described in detail above, the above description is illustrative in all respects, and the shape maintaining tool is not limited to the above description. It will be understood that numerous variations not illustrated here can be envisioned without departing from the scope of the shape maintaining tool.

The invention claimed is:

1. A shape maintaining tool for maintaining a shape of a plate-shaped metal wire when the metal wire is routed, the shape maintaining tool comprising:
    a first member having a first holding portion for holding the metal wire, and having a first coupling portion that is fixed to the first holding portion;
        wherein the first holding portion has
            a first base portion on which the metal wire is to be placed,
            a first band portion that extends from the first base portion and has a free end on a side opposite to the first base portion, and
            a hole configured to fix the free end of the first band portion after being wrapped around the metal wire; and
    a second member having a second holding portion for holding the metal wire, and a second coupling portion that is fixed to the second holding portion;
        wherein the second holding portion has:
            a second base portion on which the metal wire is to be placed,
            a second band portion that extends from the second base portion and has a free end on a side opposite to the second base portion, and
            a hole configured to fix the free end of the second band portion after being wrapped around the metal wire;
    wherein the first coupling portion and the second coupling portion are coupled so as to be capable of rotating about at least a width direction of the metal wire that is held by both the first holding portion and the second holding portion.

2. The shape maintaining tool according to claim 1,
    wherein the first coupling portion is a ball-shaped supported portion,
    the second coupling portion is a concave support portion and has an inner space that can house the first coupling portion, and
    the first coupling portion and the second coupling portion are coupled so as to be capable of rotating about three orthogonal axes.

3. The shape maintaining tool according to claim 2, wherein the first member has a first fixing portion that is to be fixed to a fixing target of a vehicle.

4. The shape maintaining tool according to claim 2, wherein the second member has a second fixing portion that is to be fixed to a fixing target of a vehicle.

5. The shape maintaining tool according to claim 1,
    wherein the first coupling portion is a circular column-shaped supported portion,
    the second coupling portion is a cylindrical support portion and has an inner space that can house the first coupling portion, and
    the first coupling portion and the second coupling portion are coupled so as to be capable of rotating about a central axis of the first coupling portion and the second coupling portion.

6. The shape maintaining tool according to claim 5, wherein the first member has a first fixing portion that is to be fixed to a fixing target of a vehicle.

7. The shape maintaining tool according to claim 5, wherein the second member has a second fixing portion that is to be fixed to a fixing target of a vehicle.

8. The shape maintaining tool according to claim 1, wherein the first member has a first fixing portion that is to be fixed to a fixing target of a vehicle.

9. The shape maintaining tool according to claim 8, wherein the second member has a second fixing portion that is to be fixed to a fixing target of a vehicle.

10. The shape maintaining tool according to claim 1, wherein the second member has a second fixing portion that is to be fixed to a fixing target of a vehicle.

* * * * *